March 8, 1927. 1,620,589
H. R. ACKERMAN
SNAGLESS FISHHOOK
Filed June 9, 1926
Fig. 1.
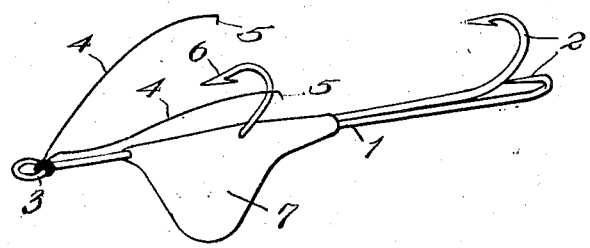
Fig. 2.
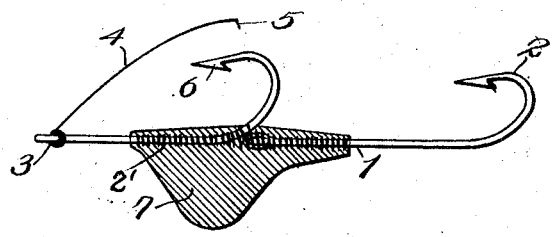
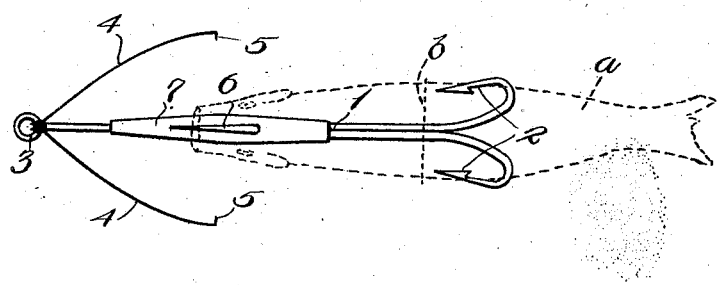
Fig. 3.
INVENTOR.
H. R. Ackerman
BY E. W. Anderson Jon.
ATTORNEY.

Patented Mar. 8, 1927.

1,620,589

UNITED STATES PATENT OFFICE.

HANNIBAL R. ACKERMAN, OF MERRILL, WISCONSIN.

SNAGLESS FISHHOOK.

Application filed June 9, 1926. Serial No. 114,701.

The invention relates to fish hooks, having for an object the provision of an improved snagless fish hook which is also as nearly weedless as possible..

The invention consists in the novel construction and combinations of parts as set forth in the appended claims.

In the accompanying drawings, illustrating the invention, Figure 1 is perspective view of the invention; Figure 2 is a side view of the same partly in section and Figure 3 is a plan view.

In these drawings the numeral 1 designates the shank of the hook, carrying at its rear end portion the upwardly extending laterally diverging twin hooks 2, 2, and at its forward end portion having an eye 3 and upwardly and rearwardly extending laterally diverging wire guards 4, 4, terminating at their outer ends in short downward or hooked bends 5, 5. Intermediately of its length, shank 1 is provided with an upwardly extending hook 6 and with a downwardly extending flat and comparatively deep blade-form sinker 7 in which the hook 6 is at its base anchored or imbedded, said hook 6 and the flat bladeform sinker being located opposite each other. The hooks project to one side of the device to approximately the same extent that the sinker 7 projects to the other side thereof. The three hooks 2, 2 and 6 are in the preferred embodiment of the invention as shown, rigidly connected and braced by the depending sinker 7, which is molded around the separate shanks of the three hooks, and is common to all of the hooks and bridges the forward and rear hooks 6 and 2, 2.

The sinker 7 engages the eyes of the rear hooks 2, 2, and the root of the point portion of the forward hook 6 and is thereby held from revolving upon the hooks, and vice versa.

The invention is useful in casting or as a troll without forming any kinks in the line, and when coming in contact with rocks, logs or any other kind of obstruction as it is being pulled or reeled in, the deep bladeform sinker is deflected, and causes the bait (which may be a minnow, a frog or strip of meat $a$ secured to the anchor hook 6 and extending back between the twin hooks 2, 2 and tied down at $b$ to hold it in place) to jump up and over the obstruction, so that the bait is given a life-like appearance which is very essential in fishing for game fish. The wire guards 4, 4 are adapted to ward the hooks off from the sides of rocks or ends of logs and also to carry up and over the hooks any floating weeds, grass or the like. The anchoring of the base of the hook 6 in the sinker 7 is of advantage in bracing the shank of said hook against strain.

Owing to the flat blade-form sinker projecting downwardly from the shank of the hook, and from the bait, it is impossible for the hooks or the bait to revolve in the water which is of manifest advantage in preventing entanglement with weeds, grass or the like.

The bait in all cases is secured only to the intermediate or anchor hook 6 and extends back and is held down between the twin hooks in the rear. The invention is capable of being made in different sizes from the small or trout size to the larger sizes for bass, pike and muskellunge.

The three hooks 2, 2 and 6 have their separate shanks bound solidly together by means of a strong copper wire 2'. The hooks 2, 2 have the end eyes thereof cast in the sinker 7, the separate shanks of the three hooks being braced by the sinker and held from rotating or being pulled out of the same.

I claim:

1. A fish hook provided intermediately of its length with an upwardly projecting hook, and in rear with laterally divergent twin hooks, and a downwardly projecting tapering deep blade-form sinker, for preventing the hooks from revolving in the water and causing the same to jump over obstructions, the three hooks having separate shanks joined together and braced by said sinker.

2. A fish hook having a plurality of hooks, and a broad blade-form sinker bridging and common to and rigidly engaging both of said hooks and projecting to one side to approximately the same extent that the hooks project to the other side thereof and adapted to prevent the hooks from revolving in the water.

3. A fish hook having a plurality of hooks and a broad blade-form sinker bridging and common to and rigidly engaging both of said hooks and projecting to one side to approximately the same extent that the hooks project to the other side thereof and adapted to prevent the hooks from revolving in the water, said sinker being tapered to cause the hook to jump in a life-like manner over obstructions.

In testimony whereof I affix my signature.

HANNIBAL R. ACKERMAN.